(12) United States Patent
Giovine

(10) Patent No.: US 6,256,843 B1
(45) Date of Patent: Jul. 10, 2001

(54) ONE PIECE REUSABLE SELF ADJUST STRAP

(76) Inventor: Julio S. Giovine, 662 Sunny Sands, Chaparral, NM (US) 88021

( * ) Notice: Subject to any disclaimer, the term of this patent is extended or adjusted under 35 U.S.C. 154(b) by 0 days.

(21) Appl. No.: 09/524,900

(22) Filed: Mar. 13, 2000

(51) Int. Cl.[7] .................................................. B65D 63/00
(52) U.S. Cl. ................................ 24/205; 24/20 R; 24/22
(58) Field of Search .................................. 24/20 R, 20 S, 24/23 R, 22, 17 A, 17 AP, 26, 16 R, 302, 306, 483, 484

(56) References Cited

U.S. PATENT DOCUMENTS

| | | | |
|---|---|---|---|
| D. 381,120 | * | 7/1997 | Barker .................................... D28/41 |
| 5,495,861 | * | 3/1996 | Liberman ............................... 24/563 |
| 5,797,168 | * | 8/1998 | Nagano .................................. 24/20 R |

* cited by examiner

Primary Examiner—Robert J. Sandy

(57) ABSTRACT

A one piece, reusable, self-adjusting bundle strap of thermoforming, flexible, resilient plastic material, formed into a several turns, resilient concentric coil, with one end in the center coil, and one in the outside coil.

6 Claims, 2 Drawing Sheets

ONE PIECE REUSABLE SELF ADJUST STRAP

BACKGROUND OF THE INVENTION

1—Field of the Invention

This invention relates to bundle straps, in particular to one reusable, self adjust bundle strap 2—Description of Related Art In today's computers and electronics world, a large number of persons carries lap top computers with at least two or three cables, cellular telephones with battery charger. At home have a number of extension cords, electric tools, appliances with cords, all of these cables have to be bundled to carry or store them.

Most existing cable or bundle straps are designed for industrial use, permanent, expensive to make and not consumer oriented. In most cases a toothed strap that is inserted in to a head or buckle, the teeth allow the strap to go through the buckle and prevents it from sliding out, many of them require tools to cut or pull it.

SUMMARY

The intention of this invention is to provide new and different strap a one piece, easy to use, inexpensive, reusable, self-adjustable and self-locking strap.

This is accomplished with a one piece bundle strap of thermoforming, flexible, resilient plastic material, formed into a several turns, resilient concentric coil, with one end in the center coil, and one in the outside coil.

DRAWINGS

Figure 7:
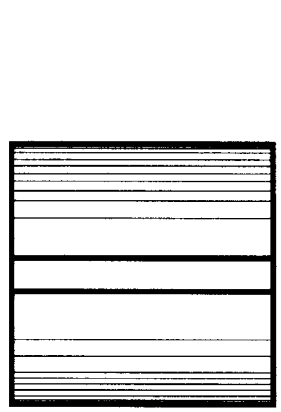
Figure 8:
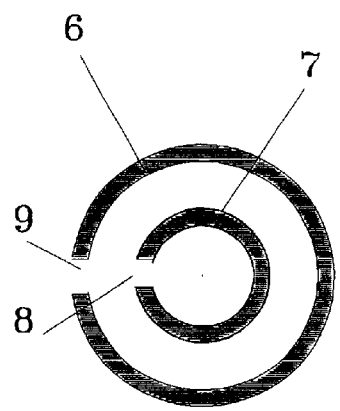
Figure 9:
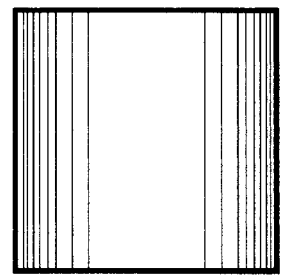
Figure 10:
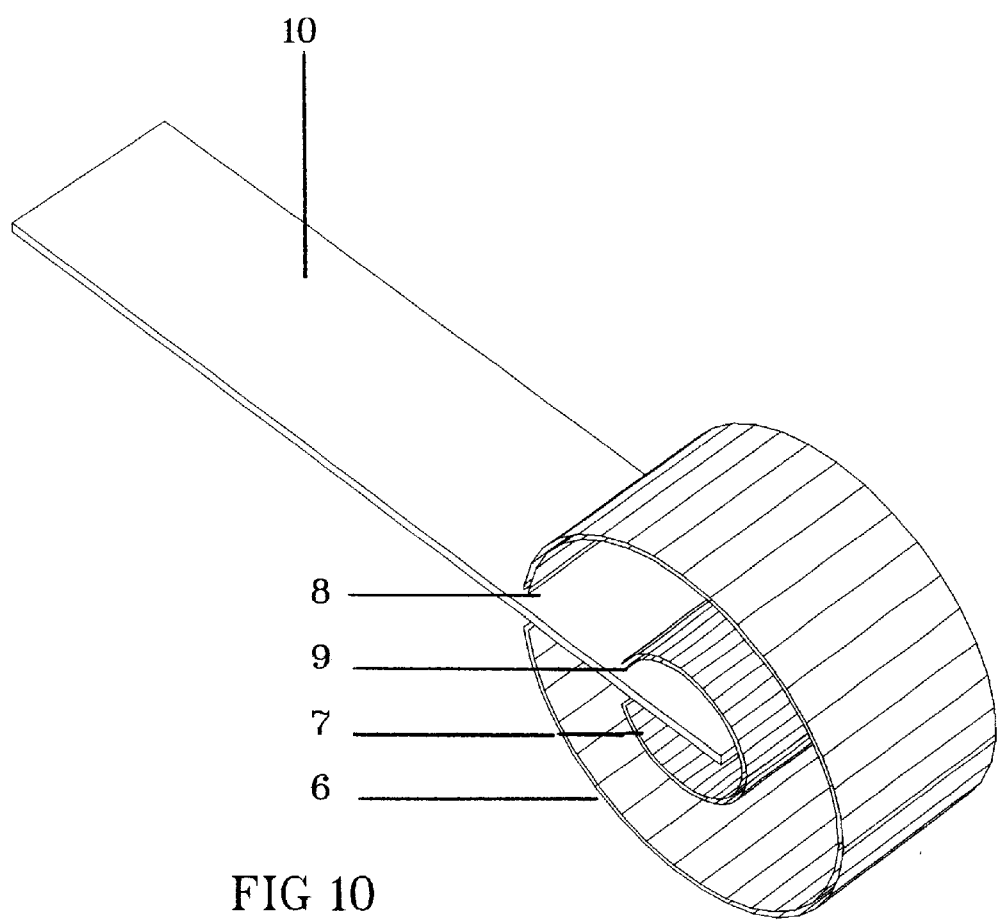

FIG. 7 is a side view of the tooling, according to the invention, used to form the concentric coil FIG. 8 is a front view of the tooling, used to form the concentric coil FIG. 9 is a top view of the tooling, used to form the concentric coil FIG. 10 is a perspective view of the tooling, used to form the concentric coil, showing the inserted strap through the slot in forming tube and into the winding tube.

DESCRIPTION

An embodiment of the invention can be better explained by way of the drawings.

Figure 1:
FIG. 1 is a side view of the coil strap, according to the invention.
Figure 2:
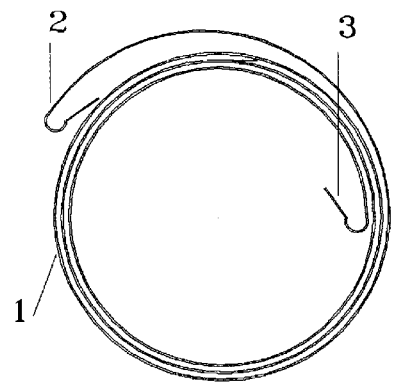
FIG. 2 represents a front view of the coiled strap with its two ends bent like a hook, one end in the center coil, and the second one at the outside coil.
Figure 3:
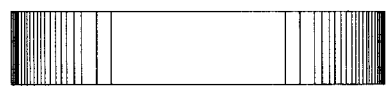
FIG. 3 is a top view of the coil strap.
Figure 4:
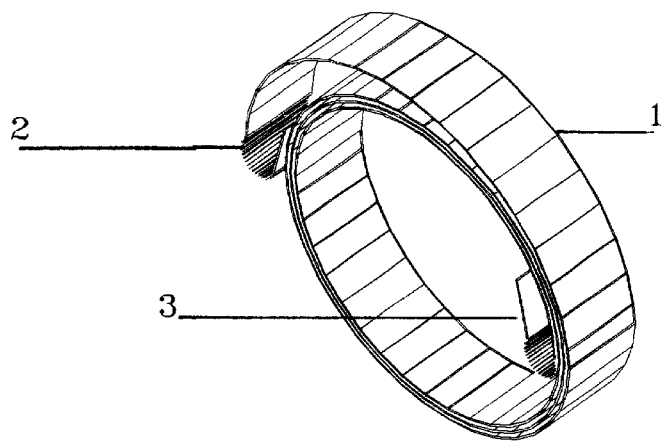
FIG. 4 shows a perspective view of the bundle strap, with its bent ends, one at the center coil, the second one at the outside coil.

As we can clearly see in FIG. 2 and FIG. 4, the strap is composed of the coil 1 and its two ends, one in the outside coil 2, the other in the center-coil 3.

Figure 5:
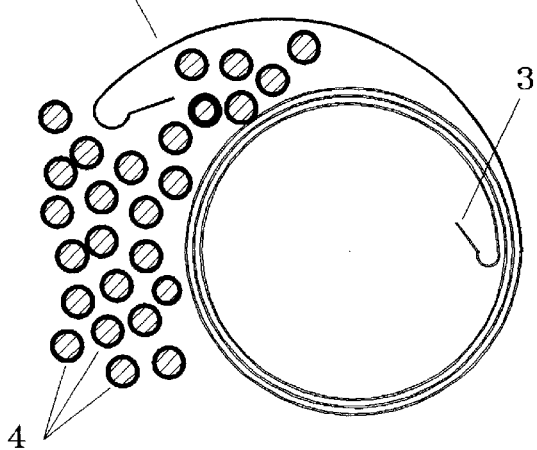
FIG. 5 is a front view showing the placement of the bundle, under the outside end of the coil.
Figure 6:
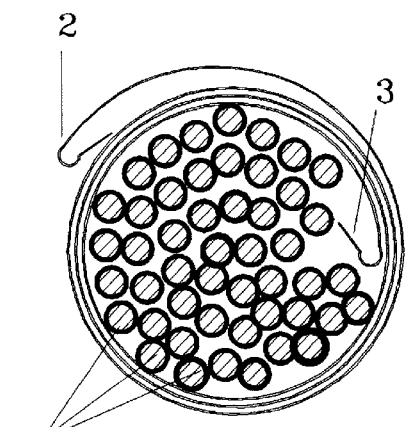
FIG. 6 is a front view showing the bundle in the center of the coil

The one-piece cable strap is of flexible resilient material formed into a resilient concentric coil having a concentric coiled body portion. The concentric coiled body portion has two free end portions, each of the free end portions having a bent portion. Each bent portion have a radius of curvature that is less than a radius of curvature of the coiled body portion; as shown in FIGS. 5 and 6. One of the bent portions 3 is nearer to the center of the coiled portion than the other bent portion 2. The bent portions has a straight planar portion extending toward a distal end of each free end portion of the concentric coil body portion, as best shown in FIGS. 4 and 5. Furthermore, the concentric body portion is formed in a winding direction; and each of the bent portions arc formed in the same winding direction as shown in FIGS. 4, 5 and 6.

To use the strap FIG. 5 the bundled cables or object 4 are placed between the outer end 2 and the coil 1, then the coil 1 is wrapped around the bundle 4. As the coil is wrapped around the bundle, it will recoil into its size and form FIG. 6, adjusting itself to the bundle size, thus holding and locking the bundle 5 firmly in the center of the coil 1, in which the original outer end coil is now in the center coil and vice versa.

To remove the strap, start at the now outer end 2 and unwrap the coil I from the bundle 5, the strap will recoil itself to its original size and form FIG. 2 and FIG. 4, ready to be used.

To make this reusable self adjust bundle strap FIG. 2 and FIG. 4, a special tool-was designed FIG. 8 and FIG. 10, and comprises: two different diameters, concentric, tubes, with a cut slot to opening parallel to the axis.

The outside tool 6 is the forming and sizing tool, changing the diameter of the tool, changes the diameter of the coil.

The inside tool 7 is the wounding tool, its diameter should be proportional to the forming tool as to allow all the strap to be wound and fit inside the forming tool.

To wind the coil FIG. 10, align the slots 8 and 9 in both tools 6 and 7, in the same direction and parallel to each other, so when the strap 10, perpendicular to the tool, is introduced through the slot 8 in the forming tool 6, go through the slot 9 in the wounding tool 7.

When the end of the strap is inside the wounding tool, if one of the tools is rotated and hold the other one, the strap will be drown and wound on the outside diameter of the wounding tool 7, when all of the strap has been drown inside the forming tool 6, there will be no longer tension on the strap 10, its resilience will expand the coil to the inside diameter of the forming tool 6, at this point the forming tool 6, with the coil inside, can be pulled out and place in an oven, to be thermoformed at the proper temperature.

The tools can be rotated in any direction, by hand, or any mechanical or electromechanical devices.

The tools could be as long as the width of one coil or as long as to wind the width of several coils and slit them later to the desired width.

The material, its thickest and its width control the resilience of the coil.

This design allows to wind, size and form a concentric coil in a very simple operation.

This tool could be automated with feeders, cutters, tension devices, tool removing and a variety of already existing tools.

What is claimed is:

1. A one-piece cable strap of flexible resilient material formed into a resilient concentric coil, the resilient concentric coil comprising:

a concentric coiled body portion having two free end portions, each of the free end portions having a bent portion, each bent portion having a radius of curvature that is less than a radius of curvature of the coiled body portion;

the concentric body portion being formed in a winding direction; and each of the bent portions being formed in the same winding direction.

2. The one-piece cable strap according to claim 1, wherein each the bent portions has a straight planar portion extending therefrom toward a distal end of each free end portion of the concentric coil body portion.

3. The one-piece cable strap according to claim 1, wherein-one of the bent portions is nearer to the center of the coiled body portion than the other bent portion.

4. The one-piece cable strap according to claim 1, wherein the cable strap is formed of thermoforming, flexible, resilient plastic material.

5. The one piece cable strap according to claim 2, wherein the cable strap is formed of thermoforming, flexible, resilient plastic material.

6. The one-piece cable strap according to claim 3, wherein the cable strap is formed of thermoforming, flexible, resilient plastic material.

* * * * *